Figure 1:
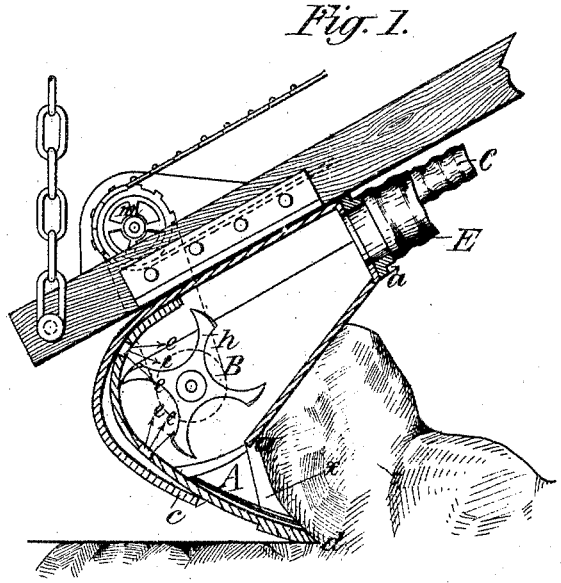

No. 776,049. PATENTED NOV. 29, 1904.
O. FRÜHLING.
DREDGING APPARATUS.
APPLICATION FILED OCT. 7, 1898.
NO MODEL. 3 SHEETS—SHEET 1.

No. 776,049. PATENTED NOV. 29, 1904.
O. FRÜHLING.
DREDGING APPARATUS.
APPLICATION FILED OCT. 7, 1898.
NO MODEL. 3 SHEETS—SHEET 3.

Witnesses
Inventor
Otto Frühling
By
Attorneys

No. 776,049.

Patented November 29, 1904.

UNITED STATES PATENT OFFICE.

OTTO FRÜHLING, OF BRUNSWICK, GERMANY.

DREDGING APPARATUS.

SPECIFICATION forming part of Letters Patent No. 776,049, dated November 29, 1904.

Application filed October 7, 1898. Serial No. 692,900. (No model.)

*To all whom it may concern:*

Be it known that I, OTTO FRÜHLING, a subject of the Duke of Brunswick, residing at Brunswick, Germany, have invented certain new and useful Improvements in Dredging Apparatus, of which the following is a specification.

The present invention relates to improvements in dredging apparatus of the class known as "suction-dredges" or those in which the transportation of the material to the surface of the water in which the apparatus is operated is effected by the suction produced by a current or stream of fluid through suitable conduits. With apparatus of this character as commonly constructed a strong current is created outside of the dredging-head or drag adjacent the mouth or inlet for excavated material or material to be dredged, which current acts to loosen a portion of the ground and draw into the drag through said mouth such or any other loose material exposed to its action, as well as to discharge such material from the drag. It is impossible, however, to so control the action of such current that the surface over which the dredging-head or drag is moved will be uniformly leveled. On the contrary, the action of such dredges is to produce a succession of holes or depressions extending to varying depths from the desired plane or level, according to the nature of the soil at the particular locality. Another and still more important objection to the forms of suction-dredges heretofore employed is that the amount of water drawn into the drag by the current produced outside of its mouth is not under the control of the operators and generally forms an undesirably-large proportion of the mixture delivered to the pump. It is of course desirable that the amount of water admitted to the dredging-head or drag shall not exceed that required to disintegrate or reduce the solid material therein to a consistency which can be properly handled by the pumping means, and this cannot be accomplished with dredging apparatus in which the suction apparatus acts to produce a current outside of the drag or dredging-head by which both water and loose solid material are simultaneously drawn into the drag through the open mouth thereof.

The object of the present invention is to provide a dredging-head or drag for suction-dredging apparatus of such a nature that no suction-current is produced on the outside of the head adjacent the inlet or mouth thereof and by which the amount of water admitted to the head may be entirely under the control of the operator, whereby the desired proportions of water and solid material in the mixture acted on by the suction devices can be maintained.

Figure 2:
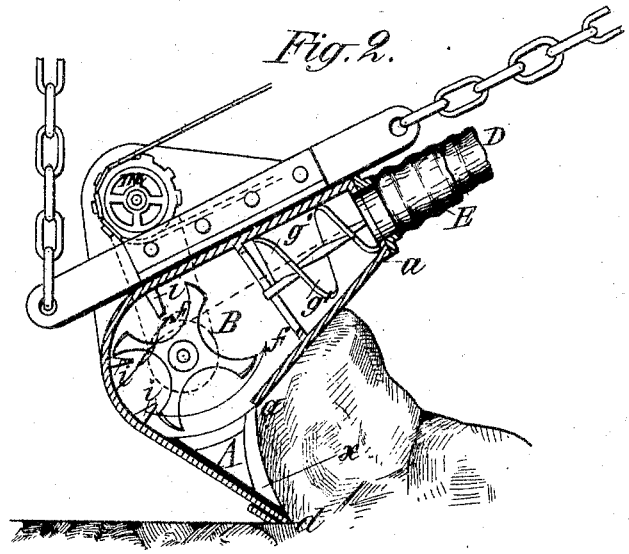
Figure 3:
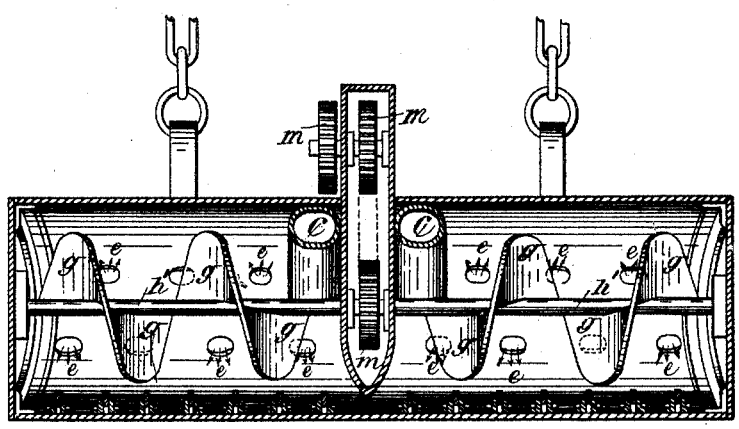
Figure 4:
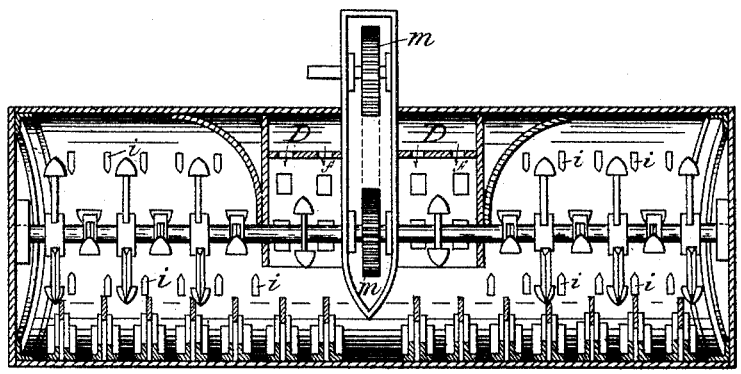
Figure 5:
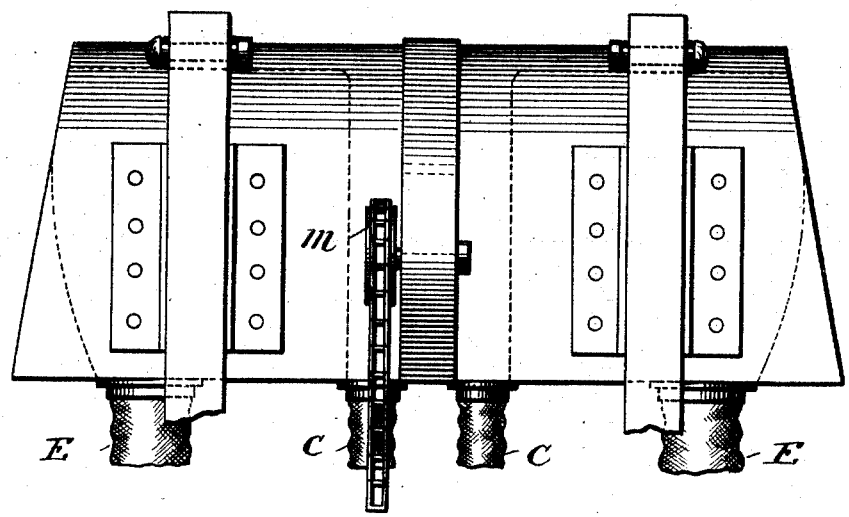
Figure 6:
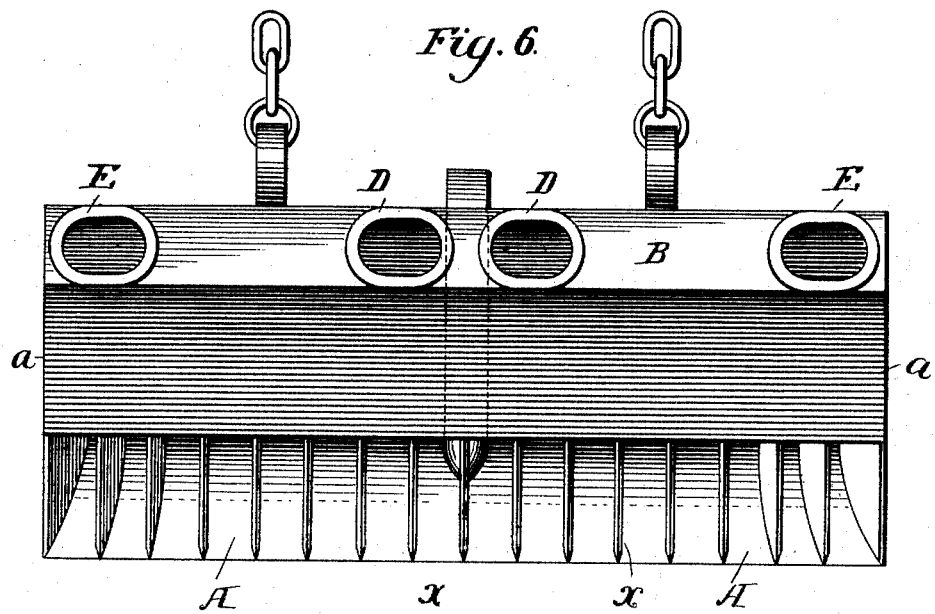

In the accompanying drawings, Figure 1 is a vertical sectional view on the line 1 1 of Fig. 5 through a dredging-head or drag constructed in accordance with the present invention. Fig. 2 is a similar view on the line 2 2 of Fig. 6, illustrating a slightly-modified form of the invention. Fig. 3 is a longitudinal sectional view through the dredging-head or drag illustrated in Fig. 1. Fig. 4 is a similar view of the drag illustrated in Fig. 2. Fig. 5 is a plan view of the drag shown in Figs. 1 and 3. Fig. 6 is a front elevation of the form shown in Figs. 2 and 4.

The improved dredger-head is chiefly composed of two parts A and B, of which the part A is the tool for digging off the soil, and the part B is the mixing-chamber, within which the separated soil is disintegrated and mixed with specially-admitted water. The part A is composed of a scoop or blade having a sharp edge *d*, which extends downwardly and forwardly from the casing B, projecting for a considerable distance in front of the dredger-head and forming the lower side or wall of the inlet or mouth of the head. This scoop serves to sever the soil in advance thereof from the surface along which the head is dragged or pushed. Above the blade and in front of the inlet opening or mouth of the head or drag a number of vertical knives *x* may be arranged, by means of which the soil is subjected to a preliminary disintegration as it is forced through such mouth in the manner hereinafter described and which prevent large-sized logs or stones from clogging the said mouth.

Above the entrance opening or mouth of the head and back of the front edge of blade A is arranged a steeply-ascending plate $a$, against which when the head is moved forward the soil is thrown and piled or packed up.

The parts A $a$ constitute or form a pocket having the mouth of the head or drag at its inner end and gradually increasing in size from said mouth to the free edge of the cutting-blade. The material removed by the digging or cutting means is initially received into this pocket, the form of which is such that as the head is moved forward said material is caused to close the mouth of the head so as to absolutely prevent the water surrounding the head or "ground water" from entering the chamber B. By the forward movement of the head a fresh quantity of soil is continually taken up by the cutting or digging devices and entering the pocket in advance of the mouth of the head or drag operates to displace the preceding quantities and force them from the pocket through the mouth of the drag into the chamber B.

The part B, it will be seen, constitutes a chamber closed on all sides and shut off from the surrounding water, and means are provided for admitting a suitable quantity of water thereto to reduce the solid material forced from the aforesaid pocket to the desired extent. The water for this purpose may be admitted through ducts or pipes D and the resulting paste-like mixture withdrawn through the suction-pipes E, which are connected with suitable pumping mechanism (not shown) commonly employed in apparatus of this character. The pipes D preferably extend upwardly from the dredging-head to near the surface of the body of water in which the apparatus is working and at their upper ends are provided with suitable valves by which the admission of water thereto can be regulated.

To assist in disintegrating or reducing the solid matter introduced into the chamber B, as aforesaid, suitable blades $g$, as shown in Fig. 3, or agitating-arms, as shown in Fig. 4, may be mounted on a suitable shaft $h'$, journaled in bearings in the dredger-head. Said shaft is adapted to be rotated by gearing $m$, connected with suitable power mechanism (not shown) or may be rotated by any suitable means. If desired, the disintegration of the solid material may be assisted or in some cases solely effected by water under pressure supplied through conduits C, connected with a suitable source of supply and with a chamber formed at the rear end of the dredging-head and communicating with the chamber B through a plurality of suitable openings or passages from which the water will be discharged into said chamber in a series of jets $e$, as indicated in Figs. 1 and 3. It will be understood that in the modification of the invention in which the pipes D are employed the water is drawn through such pipes and into the mixing-chamber B by the action of the pumping devices, by which the contents of said chamber are drawn out through the tubes E. By combining with such tubes D pressure-pipes, such as those marked C, the circulation of water can be increased. The action of water admitted through the pipes D may also be assisted by arranging a spiral conveyer $g'$ within the chamber B adjacent the inner end of the discharge-pipe E. By means of suitable guides within the chamber B the water admitted through the pipes D may be caused to traverse said chamber on lines indicated by the arrows $f$ in Fig. 2.

The dredging-head or drag is supported by any suitable device and connected with means whereby it can be moved over the surface to be dredged, such supporting and propelling means being conventionally illustrated in the drawings.

The operation of the invention has been generally described in the foregoing description and the advantages incident thereto pointed out. It may be desirable, however, to briefly repeat them. As the dredging head or drag is lowered to the surface on which it is to act the weight and relative arrangement of the cutting devices cause them to be embedded in the soil which it is desired to remove. When the head or drag is moved forward, the soil separated by the action of the cutting-blade is packed into the pocket formed in the forward face of said head, and the mouth of the latter is closed thereby, thus preventing the entrance of ground-water into the chamber B and also preventing the production of any suction-currents outside of the head or drag by the action of the pumping means. The pocket adjacent the mouth of the drag is thus filled with closely-packed material which is continuously forced into the chamber B as the drag is moved forward by the pressure exerted by the newly-raised soil separated from the bottom by the cutting means. The material thus forced into the chamber B is practically solid, the water commonly drawn into the dredging-head with the material detached from the bottom or surface in which the dredge is at work being excluded, as above stated. A sufficient quantity of water to reduce the solid material to a condition in which it can be handled by the suction-pumps is introduced into the chamber in either of the ways described, and the resulting mixture is withdrawn by the action of the suction means through the discharge-pipe E. It will thus be seen that by this invention the objections incident to suction-dredges as heretofore constructed, which have been noted in the foregoing specification, are entirely avoided.

While the embodiment of the invention illustrated in the accompanying drawings and specifically described herein includes two discharge-pipes E and a corresponding number of pipes for supplying water to the chamber B, it will be understood that any desired number of such pipes, one or more, may be employed, according to the size of the dredging head or drag.

Having thus described the invention and without intending to limit all of the claims to the details of the embodiment of the invention illustrated in the accompanying drawings, what is claimed is—

1. In a dredging apparatus, the combination of a hollow head or drag provided with cutting or digging means and an inlet or mouth through which material to be dredged enters the head, the walls of said head forming an exterior pocket in which the said material is initially received, the shape of such pocket causing the material therein to close the mouth of the drag and prevent the passage of water therethrough as the drag is drawn forward, means for disintegrating the material forced into the interior of the drag from said pocket, through said mouth, as the drag is moved forward, and means for removing such material from the drag.

2. In a dredging apparatus, the combination of a hollow head or drag provided with cutting or digging means and an inlet or mouth through which material loosened by the digging or cutting means enters the head, and means for creating suction to draw material from within said head, said head being so formed as to prevent such suction drawing material outside thereof into the head.

3. In a dredging apparatus, the combination of a hollow head or drag provided with cutting or digging means and an inlet or mouth through which material to be dredged enters the head, means for creating suction to draw material from within said head, and means for causing the material to be dredged to prevent such suction acting outside the mouth of the head.

4. In a dredging apparatus, the combination of a hollow head or drag provided with an inlet or mouth in its forward face, cutting means extending forwardly and downwardly from said mouth, and a baffle-plate arranged above said mouth and in such relation thereto and to the cutting means as to cause material moved by the action of said cutting means to prevent the passage of water through the inlet or mouth of the drag.

5. In a dredging apparatus, the combination of a hollow head or drag, means for causing material to be dredged to close the inlet through which such material enters the drag and prevent the passage of water through said inlet, means for supplying water to the interior of the drag, and suction means for removing the mixture of water and material from the drag.

6. In a dredging apparatus, the combination of a hollow head or drag, a digging device connected thereto, an entrance port or mouth for the soil being provided at the front wall of the drag, said wall steeply ascending from said mouth and serving as a baffle-plate for the piling up of the loosened soil, a discharge-pipe, means for admitting water to the drag, means for disintegrating the soil within the drag and mixing it with water supplied thereto, and means for admitting water under pressure into the drag.

In witness whereof I have hereunto signed my name in the presence of two subscribing witnesses.

OTTO FRÜHLING.

Witnesses:
R. FRÜHLING,
EDMUND GRABENSTEIN.